United States Patent
Lucioni

(10) Patent No.: US 8,270,366 B2
(45) Date of Patent: Sep. 18, 2012

(54) METHOD FOR OUTPUTTING A USEFUL DATA STREAM AND COMMUNICATIONS TERMINAL FOR RECEIVING AND FOR OUTPUTTING A USEFUL DATA STREAM

(75) Inventor: Gonzalo Lucioni, Witten (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 640 days.

(21) Appl. No.: 11/666,997

(22) PCT Filed: Sep. 7, 2005

(86) PCT No.: PCT/EP2005/054426
§ 371 (c)(1),
(2), (4) Date: Jul. 3, 2008

(87) PCT Pub. No.: WO2006/048349
PCT Pub. Date: May 11, 2006

(65) Prior Publication Data
US 2008/0279149 A1 Nov. 13, 2008

(30) Foreign Application Priority Data
Nov. 3, 2004 (DE) .......................... 10 2004 053 093

(51) Int. Cl.
*H04Q 7/00* (2006.01)
(52) U.S. Cl. ....................................... 370/331; 370/476
(58) Field of Classification Search .................. 370/252, 370/328, 331, 338, 401, 476; 455/436, 437, 455/438, 439, 442; 375/436, 437, 438, 439, 375/442
See application file for complete search history.

(56) References Cited

U.S. PATENT DOCUMENTS

| | | | |
|---|---|---|---|
| 4,947,440 A | | 8/1990 | Bateman et al. |
| 5,146,609 A | * | 9/1992 | Tayloe et al. ................. 455/436 |
| 5,349,699 A | * | 9/1994 | Erben et al. ................. 455/186.1 |
| 5,711,004 A | * | 1/1998 | Blasiak et al. ................. 455/436 |
| 5,884,173 A | * | 3/1999 | Sollner ......................... 455/436 |
| 6,148,206 A | * | 11/2000 | Karanja et al. ................. 455/436 |
| 6,252,919 B1 | | 6/2001 | Lin |
| 6,549,523 B1 | | 4/2003 | Gibbs et al. |
| 7,773,561 B2 | * | 8/2010 | Kezys et al. ................. 370/331 |

FOREIGN PATENT DOCUMENTS

| | | |
|---|---|---|
| EP | 0 865 026 A2 | 9/1998 |
| WO | WO 98/09454 A1 | 3/1998 |

OTHER PUBLICATIONS

Pat Calhoun and Bob O'Hara, "802.11r strengthens wireless voice", NetworkWorld, 2005, pp. 1-12, Retrieved from Internet Nov. 8, 2005, http://www.networkworld.comnews/tech/2005/082205techupdate.html.

* cited by examiner

*Primary Examiner* — Ricky Ngo
*Assistant Examiner* — Christine Ng

(57) ABSTRACT

A method and a communication terminal for emitting a data flow during the changeover between a first transmission path and a second transmission path are provided. A receiving pause for the data flow occurs in a receiver during the changeover between a receiving end of a first partial data flow of the first transmission path and a receiving beginning of a second partial data flow of the second transmission path, and the data flow is emitted on the receiver side. When the data flow is emitted, the receiving pause is filled with additional data, the additional data being produced previously from the first partial data flow received by means of the transmission path.

8 Claims, 2 Drawing Sheets

METHOD FOR OUTPUTTING A USEFUL DATA STREAM AND COMMUNICATIONS TERMINAL FOR RECEIVING AND FOR OUTPUTTING A USEFUL DATA STREAM

CROSS REFERENCE TO RELATED APPLICATIONS

This application is the US National Stage of International Application No. PCT/EP2005/054426, filed Sep. 7, 2005 and claims the benefit thereof. The International Application claims the benefits of German application No. 10 2004 053 093.9 DE filed Nov. 3, 2004, both of the applications are incorporated by reference herein in their entirety.

FIELD OF INVENTION

The invention relates to a method for outputting a useful data stream at the changeover between a first transmission path and a second transmission path, and to a communications terminal for receiving and for outputting a useful data stream.

BACKGROUND OF INVENTION

For mobile communication, communications terminals which are connected to a line-bound communication network by means of a radio link are frequently used. Examples of such arrangements are the known mobile radio networks, for example the GSM network, private telephone networks (DECT arrangements), WLAN arrangements etc. All these arrangements have in common the fact that bidirectional data streams in which useful data (audio data, video data etc.) is transmitted are used for the communication between one or more base stations (access point) and the mobile communications terminals (mobile telephones, cordless telephones, PDAs, multimedia PCs etc.).

SUMMARY OF INVENTION

In many cases it is not possible to cover a desired geographic area completely by means of a single base station (access point). For this reason, the mobile communication arrangements are generally embodied in a multi-cellular fashion so that a plurality of overlapping radio zones are used in order to bring about area coverage.

A particular requirement in multi-cellular communication arrangements based on radio is the free mobility of the mobile communications terminals. Such a communications terminal not only has to be accessible within the entire arrangement but also a changeover of the radio cell should also be possible during the ongoing operation without interrupting the communication link and without interrupting the call. For this purpose, the individual radio cells are arranged in an overlapping fashion so that at the changeover of the mobile communications terminal from one radio cell to an adjacent radio cell a communication link can change the radio cell used while present in an overlapping radio zone.

In the arrangements with mobile communications terminals it has proven disadvantageous that a period of time in which the communication link is briefly interrupted and during which no useful data can be transmitted to the communications terminal or from the communications terminal is present between the release of the communication link in a first radio cell and the setting up or the continuation of the communication link in a second radio cell. This brief interruption is usually felt to be disruptive. The disadvantages described apply equally to the transition between different networks, for example for the handover between a private (W)LAN and a public GSM network.

These disadvantages are often overcome in the prior art by virtue of the fact that the individual radio cells of communication arrangements are operated in synchronism with one another. For example, the useful data which is transmitted from the fixed network to the mobile communications terminal is transmitted simultaneously "in parallel" by all the radio cells at least at the time of the switchover so that at the switchover no breaks in transmission occur as a result of the release or the setting up of partial communication links—the term useful data streams is frequently also used. A disadvantage with this procedure is, however, the increased network load and the problem that a plurality of radio base stations (access points) have to be supplied simultaneously with the same useful data (duplicated useful data stream). This can usually be implemented only in arrangements with a small number of radio cells which are preferably controlled by the same network node, and is therefore generally done in this way only in the case of relatively small, private "cordless" arrangements.

In the meantime, nonsynchronous radio networks, for example radio-based "WLAN" data networks according to IEEE 802.11 are being increasingly used. While brief breaks in transmission can usually be tolerated during a changeover of the radio cell for non-real-time communication, that is to say for the classic data transmission mode, the interruptions have an adverse effect on the convenience of use for real-time communication, that is to say for example for the transmission of voice data (VoIP=Voice-over-Internet-Protocol). This problem is minimized by keeping the interruption at the changeover of a radio cell as short as possible. For this purpose, work is currently also being carried out on new standards, for example IEEE 802.11R "fast roaming"/"fast handoff". By accelerating the "handover" process (changeover of the radio cell) it is possible here to reduce the adverse effect on the communication link but not eliminate it completely. This applies in particular at the multiple changeover of the radio cells, the propagation time delays either cumulating or fragments of the voice data stream having to be rejected in order to avoid exceeding an appropriate overall delay time.

It is therefore an object of the present invention to minimize the adverse effects at the changeover of a connecting path during a communication link.

U.S. Pat. No. 6,148,206 Karanja et al. "Method for concealing a handover mute" presents a method in which impairment of the convenience of use during a break in transmission when changing over a radio cell is intended to be filled in by virtue of the fact that the signal section received last is reproduced (repeated) once more. The signal energy level ("volume") of the signal section which is output in a repeated fashion is in this context to be adapted in such a way that as far as possible a seamless transition to the signal sections which have been output previously or are output subsequently occurs.

Document U.S. Pat. No. 6,549,523 B1 Gibbs et al. "Background noise contrast reduction for handovers involving a change of speech codec" is concerned with eliminating disruption to the convenience of use during a handover. In this context, the problem is addressed of different transmission paths also having a different noise behavior so that when the transmission path is changed over the user can be irritated. In order to solve this problem it is proposed to record in each case a "noise sample" of the two transmission paths in breaks in speech and to output a mixed signal composed of the two recorded "noise samples" in a transmission time period during the handover, which is intended, on the one hand, to ensure a fluid transition between the different transmission paths which are subject to noise, and on the other hand a break in reception can be filled in.

An object is achieved by the method and by the communications terminal as described by the independent claims.

The solution provides a method for outputting a useful data stream at the changeover between a first transmission path and a second transmission path, wherein a break in reception occurs for the useful data stream at a receiver during the changeover between an end of reception of a first partial useful data stream of the first transmission path and a start of reception of a second partial useful data stream of the second transmission path, and wherein the useful data stream is output at the receiver end. Here, during the output of the useful data stream the break in reception is filled with additional useful data, wherein the additional useful data is generated from the first partial useful data stream which has previously been received over the first transmission path. The application of this method makes the changeover from the first transmission path, for example first radio cell, to the second transmission path, for example second radio cell, virtually or completely disruption-free for the receiver. Disruptive gaps (artifacts) are filled in by the method so that a useful signal can be output for the receiver continuously at any time.

The solution of the object further provides a communications terminal for receiving and for outputting a useful data stream, wherein the useful data stream can be switched over from a first link to a second link. In this context, the communications terminal is equipped with a generating device for generating additional useful data, and the communications terminal is provided with a mixing device for the weighted addition of the additional useful data to the useful data stream which is received over the second link. The use of such a communications terminal fills in a "gap" in the useful data stream at the changeover of a communication link, for example between two radio cells. It is irrelevant here whether the "gap" arises due to a delay or because parts of the useful data stream (data packets) are lost. The weighted addition of the additional useful data with the received useful data stream ensures a "gentle" transition in which specifically the weighting can be used to maintain a constant signal energy level. Avoiding a fluctuating average signal energy level prevents a receiver being irritated.

The method is advantageously developed by means of the features of dependent patent claims. The features and advantages described here apply appropriately also to the communications terminal according to the invention. The communications terminal is advantageously developed by means of the features of dependent patent claims whose features and advantages are also to be appropriately applied to the method according to the invention.

Irritation at a receiver or user is reduced or avoided if the additional useful data is generated by chronologically stretching at least part of the first partial useful data stream. As a result, the chronological gap at the changeover is filled by useful data which originates to a large extent from the first partial useful data stream and therefore ideally has a real information content, in contrast to the alternative, which is however easy to implement, of filling the chronological gap, that is to say the break in reception, with a noise signal or the like.

If, during the outputting after the break in reception, a data stream which is composed of the additional useful data and the second useful data stream is output for a transition time period, a "gentle" transition occurs which is frequently unremarkable and which a receiver therefore subjectively feels is nondisruptive. It is advantageous here if, for the generation of the composite useful data stream, the additional useful data is weighted with a first variable factor and the second useful data stream is weighted with a second variable factor, in which case the sum of the squared first variable factor and the squared second variable factor is at least virtually constant in each case. As a result, a largely constant signal energy level is ensured, with this signal energy level which is constant for the transition advantageously corresponding to the average signal energy level of the first partial useful data stream. Whereas phase shifts, for which the human ear is not very sensitive, can therefore occur at the changeover to a limited degree, signal energy fluctuations, that is to say consequently amplitude fluctuations, to which the human ear is sensitive, are partially or completely avoided. As a result, a subjectively pleasant, often unnoticeable changeover occurs between the transmission paths.

The "filling in" of the break in reception results in a delay (phase shift) for the second partial useful data stream. This delay can be compensated for by chronologically compressing the second partial useful data stream after the complete changeover of the outputting onto the second partial useful data stream until the delay which has occurred owing to the break in reception is compensated for. This is particularly advantageous after a multiple changeover of the transmission paths because the breaks in reception (delays) which occur here in each case otherwise add to one another (cumulate), thus leading to a progressive worsening in quality.

A particularly frequent application case occurs if a digital audio signal of a voice link (VoIP link) is used as the useful data stream. In these cases, cellular communication networks which are not optimized for voice data transmission (for example LAN/WLAN arrangements) can also be used for real-time communication links. In this case the mobility of a receiver is advantageously given by the fact that a radio link is used for at least one of the transmission paths. In this context, the method can also advantageously be used for nonhomogenous structures in which line-bound and radio-based transmission paths are used alternately in a mixed fashion. Another important application occurs if a first radio cell of a multi-cellular radio network is used as the first transmission path and a second radio cell of a multi-cellular radio network is used as the second transmission path, in which case the changeover is used for transferring a radio link from the first radio cell to the second radio cell. In this context, in particular the disadvantages which nonsynchronous radio cell arrangements have for real-time communication are reduced or even entirely avoided.

The communications terminal according to the invention is advantageously used to carry out the method described above, with said terminal having a generating device for implementing a changeover process which is as unnoticeable as possible, said generating device being configured to stretch the useful data stream which is received over the first link. As a result, the break in reception is filled with "meaningful" useful data. The entire delay which occurs here can be compensated for again by the communications terminal if the latter has a device for chronologically compressing the useful data stream which is received over the second link, said device chronologically compressing the second partial useful data stream until the delay which has occurred owing to the break in reception has been compensated for again.

The adverse effect during the outputting of the useful data stream is reduced further if the communications terminal has a sensing device for sensing breaks in speech in the useful data stream which is received over the first link and/or in a useful data stream which is to be transmitted, with the sensing device being configured to control the time for the switchover by reference to a detected break in speech. As a result, the changeover can be "shifted" into one of the breaks in speech which frequently occur in any case so that the probability of a perceptible adverse effect is reduced further. In the case of useful data streams which do not have a break in speech or other signal breaks for a relatively long period of time, it is also possible to generate such a break "artificially" by, for example, "gentle" brief attenuation of the useful data stream, in which case the changeover of the transmission path is performed during this brief attenuation.

The communications terminal also advantageously comprises a control device for defining parameters which, during the addition, determine the weighting of the additional useful data and/or of the useful data stream which is received over the second link. This ensures that a useful data stream with a largely constant signal energy level is output at the receiver, with irritation at the receiver as a result of a fluctuating signal energy level ("volume") being avoided.

BRIEF DESCRIPTION OF THE DRAWINGS

Exemplary embodiments of the method according to the invention are explained below with reference to the drawings which serve at the same time to explain a communications terminal according to the invention.

In said drawings.

DETAILED DESCRIPTION OF INVENTION

Figure 1:
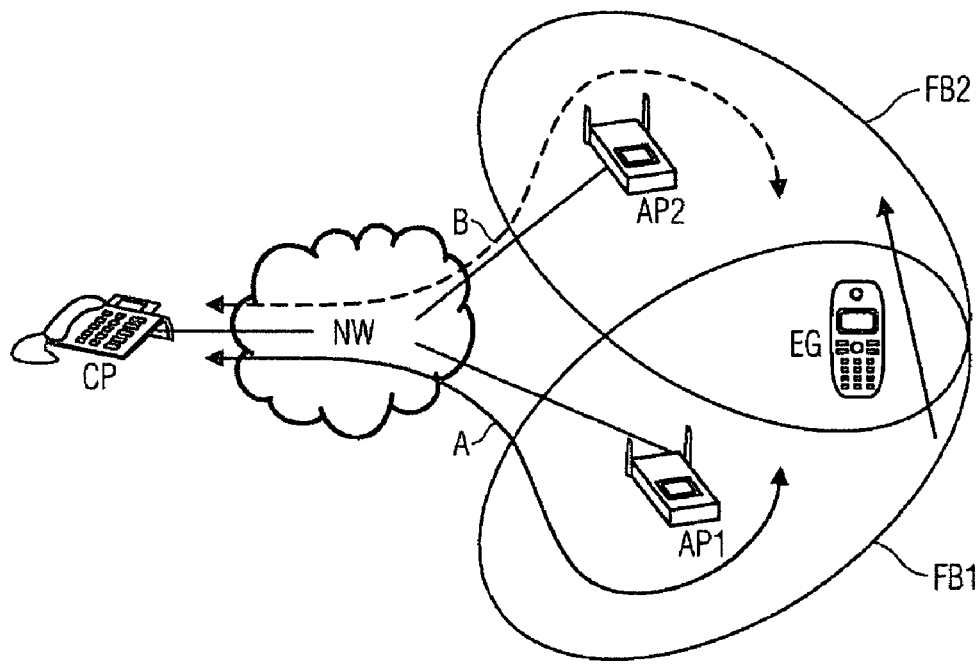
FIG. 1 is a schematic illustration of a communication arrangement in which a mobile communications terminal changes over between two radio cells.

FIG. 1 is a schematic illustration of a communication arrangement in which a mobile communications terminal EG is connected to a stationary party CP to the communication. Here, the party CP to the communication is connected via a communication node (not illustrated) to a public communication network NW, while the mobile communications terminal EG is connected via radio base stations AP1, AP2 (access points) to the communication network NW. The radio base stations AP1, AP2 each supply a radio zone FB1, FB2 (radio cell), the radio zones FB1, FB2 having a common overlapping area.

The radio base stations AP1, AP2 are part of an asynchronous multi-cellular radio network, in this case what is referred to as a wireless LAN (WLAN). The useful data for the communication link is transmitted between the party CP to the communication and the communications terminal EG at least on the partial links between the radio base stations AP1, AP2 and the communications terminal EG, in each case packet-switched according to the Internet protocol (TCP-IP, UDP-IP).

Within the scope of this exemplary embodiment it is assumed that the communications terminal EG is intended to change over from the radio zone FB1 into the radio zone FB2 while the communication link is in existence, which is symbolized in FIG. 1 by an arrow.

The communication link between the party CP to the communication and the mobile communications terminal EG comprises not only signaling messages (not considered here) but also a bidirectional useful data stream, and within the scope of this exemplary embodiment only the useful data stream from the party CP to the communication in the direction of the mobile communications terminal EG is to be considered. In this context, the communications terminal EG is firstly supplied in the radio zone FB1 by a first partial useful data stream A from the radio base station AP1 in a first link, and after the changeover in the radio zone FB2 by a second partial useful data stream B by the radio base station AP2 in a second link. The changeover is carried out while the communications terminal EG is located in the overlapping area of the radio zones FB1, FB2.

The radio technology used in the radio zones FB1, FB2 is optimized for non-real-time communication, i.e. that at a changeover from one radio cell into an adjacent radio cell a chronological "gap" (delay) can occur but in this context no useful data or useful data packets are lost. Instead of the WLAN radio network considered here, it is however also alternatively possible to use a transmission method which is optimized for real-time communication links. In such a method, no reception acknowledgement for useful data packets is often performed for reasons of optimizing propagation time (for example UDP protocol). In this context it is possible, in particular at a changeover of the radio cell, for useful data packets either to be lost or else to arrive delayed at the receiver in such a way that they can no longer be taken into account (passed on). In this context it is also possible for there to be chronological gaps which can be due both to delays and to data losses.

Figure 2:
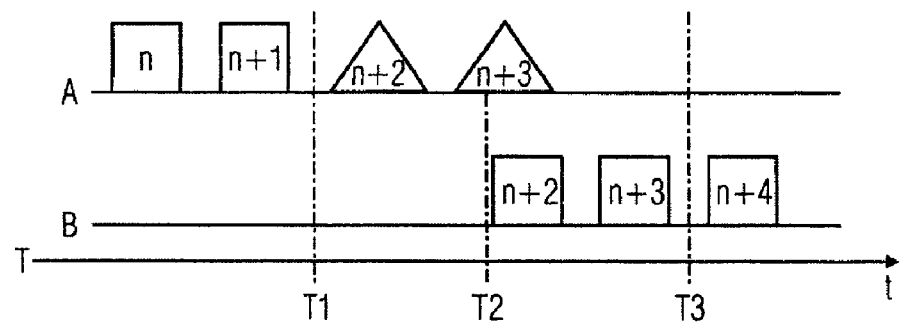
FIG. 2 is a schematic illustration of the useful data packets of two partial useful data streams along a time axis.

FIG. 2 is a schematic illustration of the partial useful data streams A, B plotted against a time axis T, with the partial useful data streams A, B having data packets n, n+1, n+3, n+4 which are illustrated as squares and have a digitized audio signal (audio data) which are transmitted from the party CP to the communication to the mobile communications terminal EG. At the time T1, the changeover from the first partial useful data stream A to the second partial useful data stream B is initiated, with no further data packets being transmitted to the communications terminal EG by means of the partial useful data stream A after the time T1. Since the next data packets n+2, n+3, n+4 which are illustrated as squares do not arrive at the communications terminal EG until after the time T2, a break in reception occurs which is filled in with additional useful data. In the present case, therefore, the last data packets n, n+1, which arrive by means of the partial useful data stream A and which are present in a reception data buffer, are chronologically stretched in such a way that new data packets are produced which themselves consist partially of the contents of the originally transmitted data packets n, n+1, and partially of artificially generated, additional information which consists, for example, of echo signal components and of interpolated useful data values. Methods for "stretching" digitized audio signals are adequately known in the prior art, for example also in the German patent application with the official application file number 103 270 57.4. A simple alternative is to output a "colored" noise signal which should correspond in its frequency spectrum to the average frequency spectrum of the previously received useful data.

The additional data packets are characterized in FIG. 2 by means of triangles with the designations n+2, n+3. Starting from the time T2, "real" useful data packets n+2, n+3, n+4 are received by means of the partial useful data stream B, these useful data packets also being buffered in the reception data buffer and then being output. Therefore, at the time T2, when packets are passed on, switching over is performed between the additional data packets n+2, n+3 (represented by means of triangles) and the newly received data packets n+2, n+3, n+4 (represented by squares).

In order to make the transition "gentler", a mixed signal is output in the transition time between T2 and T3, with the data packets of the first partial useful data stream A being weighted (multiplied) with a variable factor $C_1$, and the data packets of the partial useful data stream B being weighted (multiplied) with a variable factor $C_2$. In this context, the signal profiles for the factors $C_1$, $C_2$ are strictly monotonously declining or rising. The sum of the squared factors $C_1$, $C_2$ should at least approximately yield a constant value (in standardized systems this is the value 1) at any time so that a jump in the signal energy level of the last output signal passed on is avoided.

The previously described process is advantageously performed in a break in speech. In this context, use is made of the fact that a relatively long time window is available for the changeover, and in this time window each of the two radio zones FB1, FB2 can reliably supply the communications terminal EG.

Figure 3:
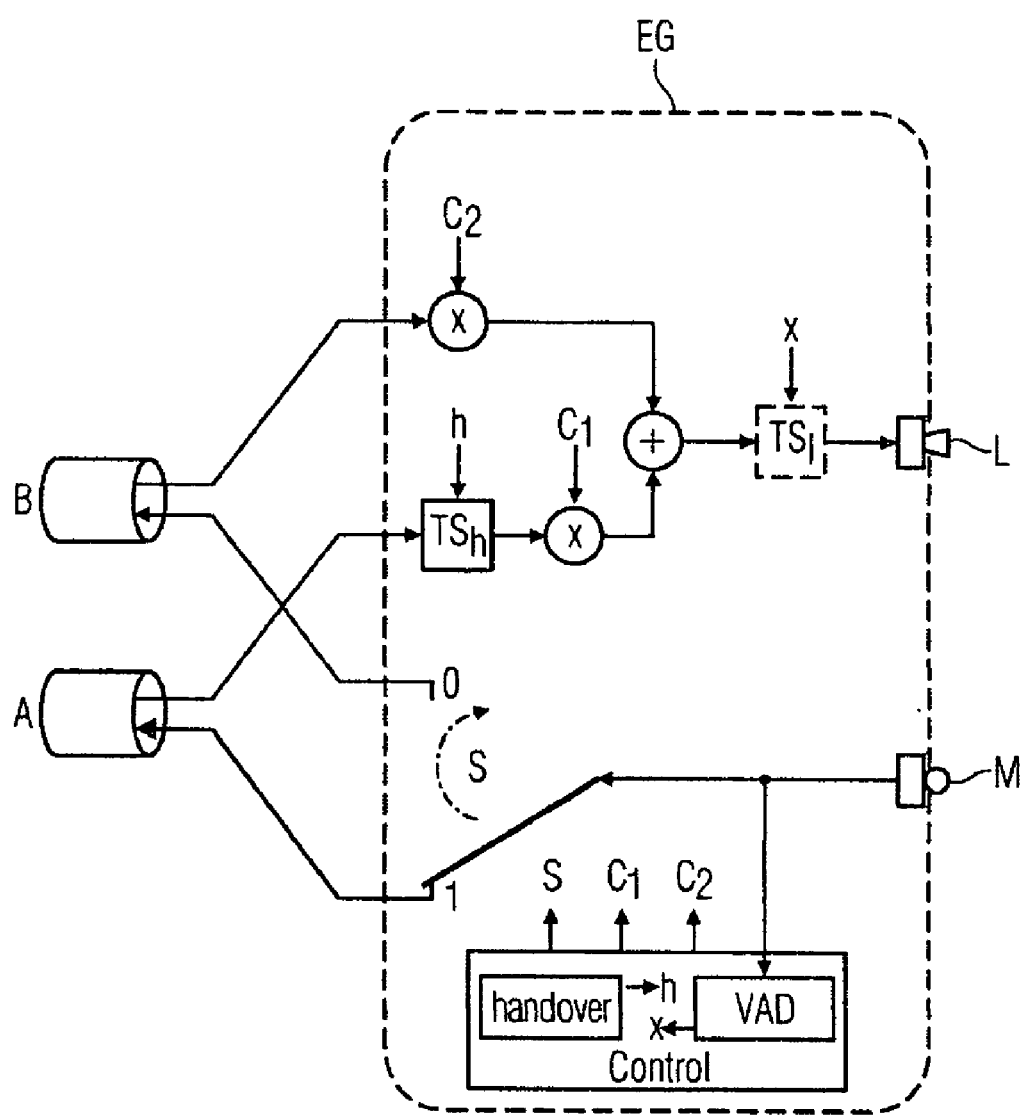
FIG. 3 is a schematic illustration of a communications terminal which is configured to change over between the two partial useful data streams.

FIG. 3 is a schematic illustration of the most important functional blocks of the communications terminal EG. Here, the voice data which is generated (the microphone M is illustrated here symbolically as a generating element) is directed either over a first transmission path A or over a second transmission path B depending on a switch position 0.1. On the other hand, the communications terminal EG is also configured to receive partial useful data streams A, B. A control device "Control" contains a sensing device VAD ("voice activity detection") for monitoring the voice activity in a useful data stream and a logic device "handover" for controlling the changeover process. As a result, the control device "Control" determines the time S of the switching over (that is to say of the changeover) and the value of the factors (parameters) $C_1$, $C_2$ at any time. Furthermore, the control device "Control" generates control signals x, h (not illustrated here) for controlling a signal stretching device $TS_h$ and a signal compression device $TS_1$. While the incoming partial useful data stream A firstly runs through the signal stretching device $TS_h$ as a generating device and is then weighted with the factor $C_1$, the useful data of the partial useful data stream B is weighted with the factor $C_2$. Both resulting signals are added in a mixing device "+", are fed to the signal compression device $TS_1$ which is controlled by the control device Control, and said signals are then output via a loudspeaker L. It is to be noted here that the control device "Control" is not necessarily part of the terminal EG but can also be arranged in another entity (component) of the communication arrangement, even in a "distributed" form.

The invention claimed is:

1. A method for outputting a data stream, comprising:
    changing over between a first transmission path and a second transmission path;
    wherein a break in reception occurs for the data stream at a receiver during the changeover between an end of reception of a first partial data stream having first data packets of the first transmission path and a start of reception of a second partial data stream having second data packets of the second transmission path;
    outputting the data stream at the receiver end;
    filling the break in reception with additional data during the output of the data stream;
    generating the additional data by chronologically stretching at least part of the first partial data stream;
    outputting a mixed signal formed by combining the additional data with data from the second partial data stream; and
    wherein during the combining of the additional data with data from the second partial data stream to form the mixed signal the additional data is weighted with a first variable factor and the data from the second partial data stream is weighted with a second variable factor.

2. The method as claimed in claim 1, wherein the mixed signal is output after the break in reception for a transition time period.

3. The method as claimed in claim 1, wherein the second partial data stream is chronologically compressed.

4. The method as claimed in claim 1, wherein a digitized audio signal of a voice link is used as the data stream.

5. The method as claimed in claim 4, wherein the digitized audio signal is monitored for breaks in speech and the changeover is performed in a break in speech.

6. The method as claimed in claim 1, wherein a radio link is used for at least one of the transmission paths.

7. The method as claimed in claim 6,
    wherein that a first radio cell of a multi-cellular radio network is used as the first transmission path, and a second radio cell of a multi-cellular radio network is used as the second transmission path, and
    wherein the changeover is used for transferring a radio link from the first radio cell to the second radio cell.

8. A method for outputting a data stream, comprising:
    changing over between a first transmission path and a second transmission path;
    wherein a break in reception occurs for the data stream at a receiver during the changeover between an end of reception of a first partial data stream having first data packets of the first transmission path and a start of reception of a second partial data stream having second data packets of the second transmission path;
    outputting the data stream at the receiver end;
    filling the break in reception with additional data during the output of the data stream;
    generating the additional data by chronologically stretching at least part of the first partial data stream; and
    outputting a mixed signal formed by combining the additional data with data from the second partial data stream; and
    wherein during the combining of the additional data with data from the second partial data stream to form the mixed signal the additional data is weighted with a first variable factor, the data from the second partial data stream is weighted with a second variable factor, and a sum of the squared first variable factor and the squared second variable factor is a constant.

* * * * *